United States Patent [19]
Zarchy

[11] Patent Number: 5,973,274
[45] Date of Patent: Oct. 26, 1999

[54] VEHICLE WEIGHING SYSTEM FOR DYNAMOMETER

[75] Inventor: Richard R. Zarchy, Crystal Lake, Ill.

[73] Assignee: Snap-on Tools Company, Kenosha, Wis.

[21] Appl. No.: 09/054,789

[22] Filed: Apr. 3, 1998

[51] Int. Cl.⁶ .......................... G01G 19/52; G01G 19/02; G01G 19/00
[52] U.S. Cl. .......................... 177/132; 177/141; 177/146; 177/245; 73/862.18
[58] Field of Search ..................................... 177/141, 146, 177/132, 133, 134, 245; 73/862.17, 862.18, 1.13; 702/101, 102

[56] References Cited

U.S. PATENT DOCUMENTS

| | | | |
|---|---|---|---|
| 4,137,977 | 2/1979 | Alger | 177/146 |
| 4,403,680 | 9/1983 | Hillesheimer | 177/146 |
| 4,651,838 | 3/1987 | Hamilton et al. | 177/141 |
| 4,832,141 | 5/1989 | Perini et al. | 177/141 |
| 5,086,647 | 2/1992 | Kamata et al. | 73/862.17 |
| 5,285,020 | 2/1994 | Jurca | 177/141 |
| 5,509,293 | 4/1996 | Karumanchi | 177/141 |
| 5,666,295 | 9/1997 | Bruns | 177/141 |
| 5,780,783 | 7/1998 | Heider et al. | 177/141 |
| 5,844,145 | 12/1998 | D'Angelo | 73/862.18 |

*Primary Examiner*—Randy W. Gibson
*Attorney, Agent, or Firm*—Emrich Dithmar

[57] ABSTRACT

A dynamometer, which includes a frictional drive assembly for engaging a pair of vehicle tires, and a lift assembly including two air bags for respectively lifting the vehicle tires and the associated portion of the vehicle to a raised position out of engagement with the drive assembly, has a controller operating under stored program control and pressure sensors connected to the controller and in fluid communication with the air bags. The pressures in the air bags when the vehicle is lifted are used to calculate the weight lifted in accordance with a straight-line functional relationship between air bag pressure and vehicle weight lifted for a particular type of air bag. A routine for calibrating the weighing system is also included.

20 Claims, 3 Drawing Sheets

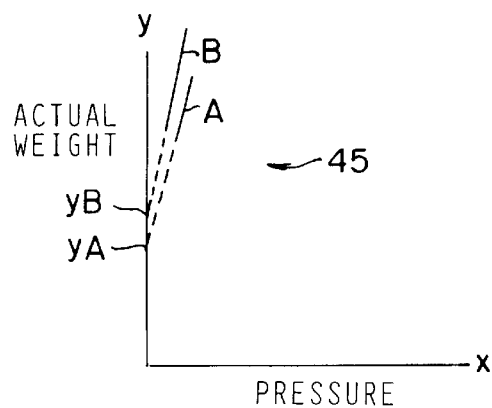
FIG. 6
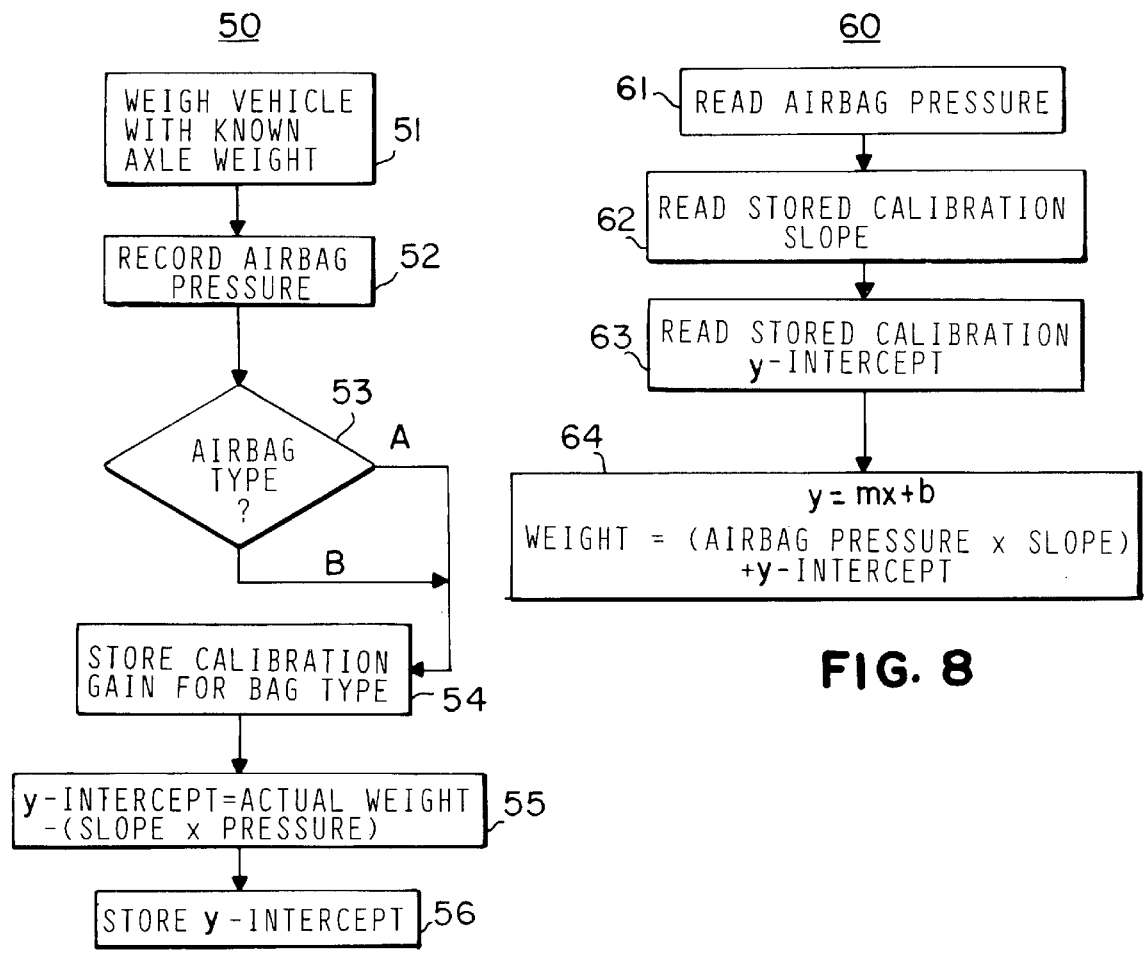
FIG. 7
FIG. 8

VEHICLE WEIGHING SYSTEM FOR DYNAMOMETER

BACKGROUND OF THE INVENTION

The present invention relates to vehicle test equipment and, in particular, to chassis dynamometers, and also relates to vehicle weighing systems.

Chassis dynamometers are used for road simulation and other controlled engine loading tests for the purpose of exhaust emission measurement, vehicle performance testing and diagnostics. In order to meet the requirements of the 1990 Clean Air Act there has been an increasing use of chassis dynamometers in vehicle emissions testing. Dynamometers provide a better simulation of actual driving conditions and, as a consequence, cause the vehicle to generate more realistic levels of exhaust emissions, than do tests in which the vehicle's engine is not loaded. Test vehicles transfer their power to the dynamometer through a frictional drive assembly, such as a set of rollers rotating under the vehicle driving wheels. The rollers are mechanically coupled to a power absorber that applies the designated loading by means of computer control. Inertia simulation is typically achieved mechanically or electromechanically.

Dynamometers are commonly provided with a lift mechanism, which may include air bags connected to lift plates for engaging the vehicle tires and raising them above the levels of the rollers to facilitate moving the vehicle onto and off of the roller assemblies.

The engagement of the vehicle tires on the rollers creates friction losses, which are proportional to the vehicle weight supported on the dynamometer rollers. In order to obtain accurate measurements, the vehicle must be weighed to calculate the friction losses to the tires. Thus, certain state regulations now require that the "axle weight" of the vehicle, i.e., the weight of the part of the vehicle which actually rests on the dynamometer, must be measured, this axle weight usually being some predetermined percentage of the overall vehicle weight. Thus, it is necessary for testing facilities to provide some means for measuring the vehicle axle weight. One such technique is to use strain gauges for measuring the vehicle weight before the vehicle is placed on the rollers. A strain gauge generates a voltage proportional to the weight, but such strain gauge weight measuring systems are rather expensive.

SUMMARY OF THE INVENTION

It is a general object of the invention to provide a weighing system and method for use with a chassis dynamometer which avoids the disadvantages of prior weighing systems and methods while affording additional structural and operating advantages.

An important feature of the invention is the provision of a weighing method which does not require the use of any weighing apparatus apart from the dynamometer.

Still another feature of the invention is the provision of a method of the type set forth, which utilizes the dynamometer's own lift assembly for measuring vehicle axle weight.

Yet another feature of the invention is the provision of a method of the type set forth, which recognizes a linear relationship between vehicle weight and air pressure for dynamometer air bags.

A still further feature of the invention is the provision of a weight system utilizing the method of the type set forth.

In connection with the foregoing feature, a further feature of the invention is the provision of a weighing system of the type set forth which utilizes a computer-executed software routine.

A further feature of the invention is the provision of a weighing system and method of the type set forth which are susceptible of single-point calibration.

Certain ones of these and other features of the invention may be attained by providing a vehicle weighing system for a dynamic vehicle tester including a frictional drive assembly for engaging a pair of vehicle tires, and a fluid-actuated lift assembly coupled to a source of pressurized fluid and engageable with the vehicle for lifting the pair of vehicle tires and the associated portion of the vehicle to a raised position out of engagement with the drive assembly, the weighing system comprising: a controller coupled to the drive assembly and to the lift assembly for controlling the operations thereof, and a pressure sensor connected to the controller and in fluid communication with the lift assembly for sensing the pressure in the lift assembly when in the raised position for generating a pressure signal, the controller including means operable under stored program control and responsive to the pressure signal for determining the weight of the vehicle portion lifted by the lift assembly.

Further features of the invention may be attained by providing a computer routine executed by the controller with both calibrating and weighing portions.

Still further features may be attained by providing a weight-measuring method of utilizing a dynamic vehicle tester of the type set forth, wherein there exists for the lift assembly a relationship between the fluid pressure therein and the weight lifted expressed as a function of a known constant parameter and a variable parameter, the method comprising the steps of: lifting a known weight with the lift assembly and recording the known weight fluid pressure, utilizing the known weight and the known weight fluid pressure and the known constant parameter to calculate the variable parameter for calibrating the lift assembly, lifting an unknown vehicle weight with the lift assembly and recording the unknown weight fluid pressure, and utilizing the unknown weight fluid pressure and the known constant parameter and the calculated variable parameter for calculating the unknown vehicle weight lifted.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 6 is a graph illustrating the linear relationship between pressure and weight for two different dynamometer air bags;

FIG. 7 is a flow chart illustrating the computer software routine for calibrating the weighing system of the present invention; and FIG. 8 is a flow chart illustrating the computer software routine for using the weighing system of the present invention for measuring an unknown vehicle weight.

DESCRIPTION OF THE PREFERRED EMBODIMENT

Figure 1:
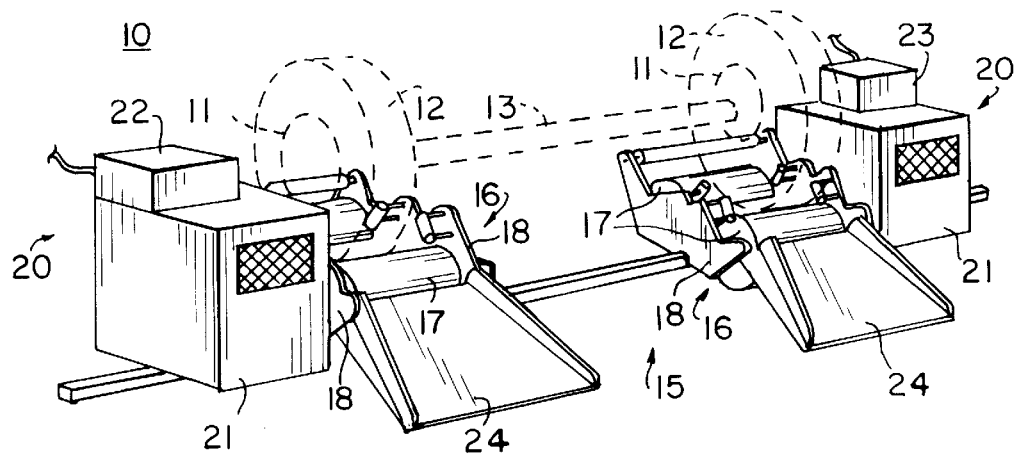
FIG. 1 is a perspective view of a chassis dynamometer incorporating the features of the present invention, and illustrating a vehicle axle thereon in phantom.
Figure 2:
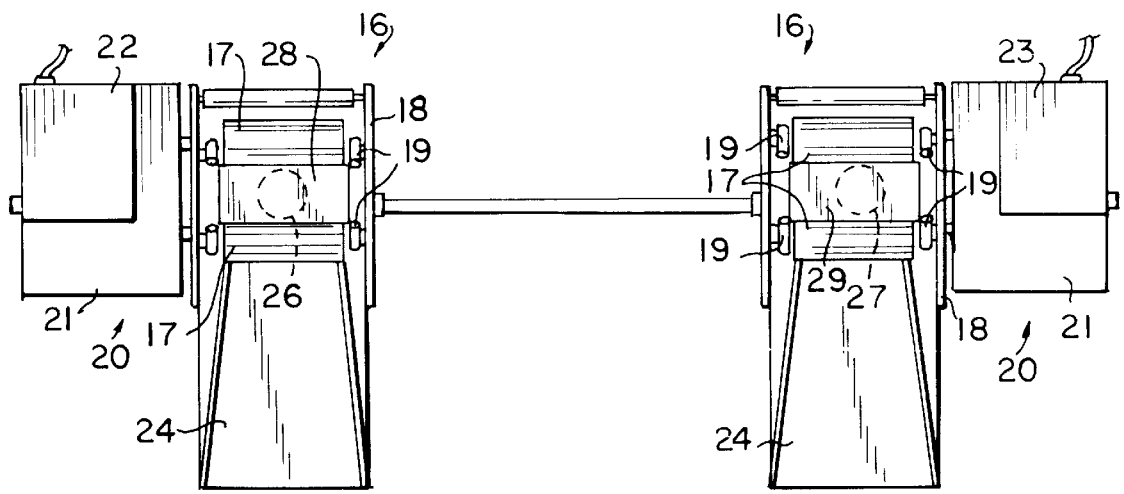
FIG. 2 is a top plan view of the dynamometer of FIG. 1.
Figure 3:
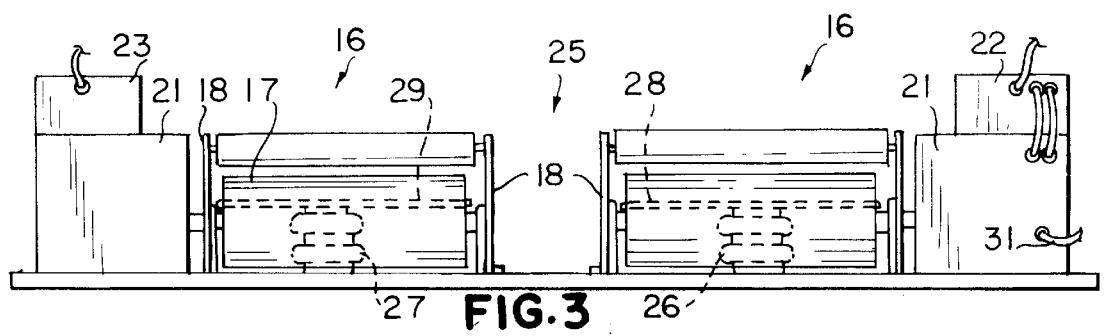
FIG. 3 is a rear elevational view of the dynamometer of FIG. 1.

Referring now to FIGS. 1–3, there is illustrated a chassis dynamometer, generally designated by the numeral 10, which is representative of a dynamometer of the type which can be used with the present invention.

The dynamometer 10 is adapted for use in a well-known manner with a pair of vehicle wheels 11 having tires 12 and rotating with respect to a common axle 13. Typically, the axle 13 will be the drive axle of the associated vehicle. In this regard, it will be appreciated that the vehicle has an "axle weight" corresponding to the percentage of the overall vehicle weight supported on the axle 13.

The dynamometer 10 has a friction drive assembly 15 which incorporates two roller units 16, respectively adapted for engagement with the vehicle tires 12. Each of the roller units 16 includes a pair of spaced rollers 17 rotating about parallel axes journaled in side support plates 18, all in a well-known manner. Side guide rollers 19 may also be supported on the support plates 18 for engagement with the side walls of the vehicle tires 12 to maintain the tires 12 on the roller units 16. The roller units 16 are respectively coupled to associated loading systems 20, each provided with a housing 21. Each loading system 20 may include an absorber/flywheel and associated load cell (not shown), all in a known manner. Respectively mounted on the housings 21 are control boxes 22 and 23 which include electronic and pneumatic control equipment for the dynamometer 10. Ramps 24 are provided to facilitate driving the vehicle tires 12 onto and off of the roller units 16.

To further facilitate driving the vehicle onto and off of the roller units 16, the dynamometer 10 includes a fluid-actuated lift assembly, generally designated by the numeral 25 (FIG. 3), which is preferably a pneumatic system including air bags 26 and 27, respectively associated with the roller units 16. The air bags 26 and 27 are, respectively, provided with lift plates 28 and 29 positioned between the rollers 17 of the roller units 16, again in a well-known manner. In use, the air bags 26 and 27 are inflated with pressurized air from an associated source to raise the lift plates 28 and 29 and lift the vehicle tires 12 clear of the rollers 17 and facilitate driving the vehicle tires 12 on and off the dynamometer 10, in a known manner.

Figure 4:
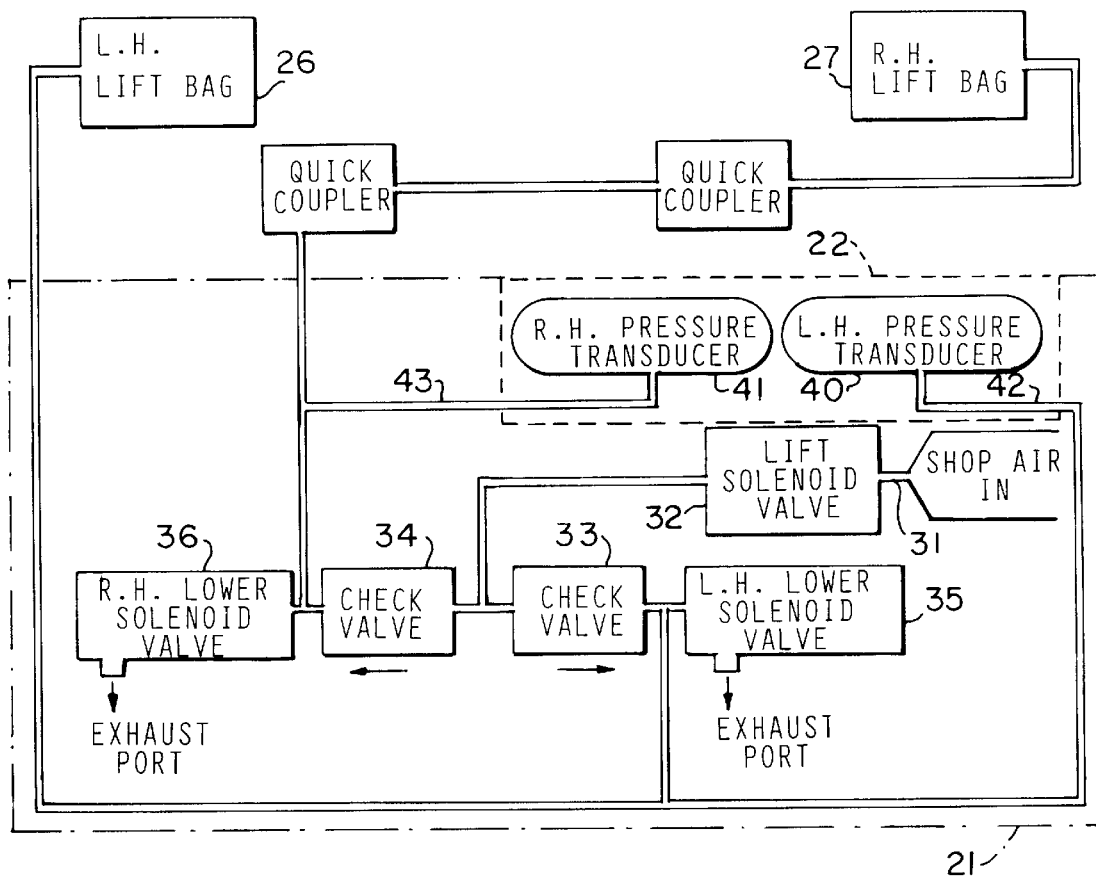
FIG. 4 is a schematic diagram of the pneumatic circuit of the dynamometer of FIGS. 1–3.
Figure 5:
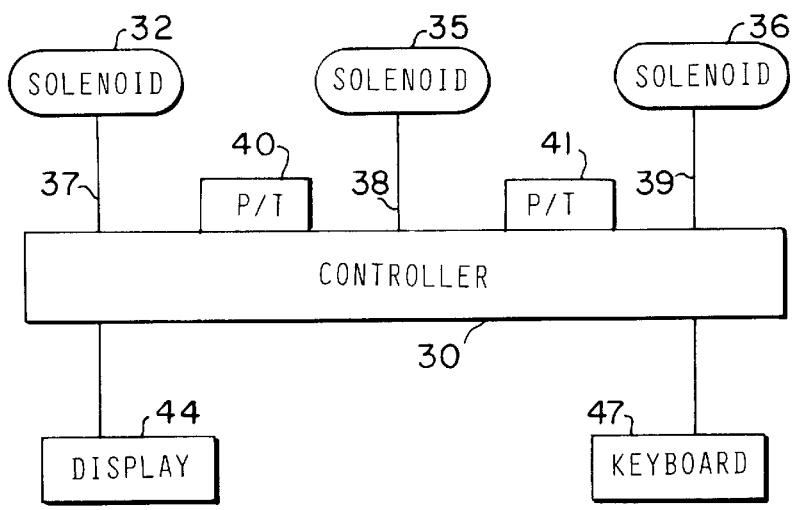
FIG. 5 is a functional block diagram of the electrical control system for the present invention.

Referring to FIGS. 4 and 5, the dynamometer 10 includes a controller 30, which includes electronic equipment for controlling the operation of the loading systems 20 and the lift assembly 25. Preferably, the controller 30 incorporates, or is connected to, an associated computer or microprocessor.

For controlling the lift assembly 25, there is provided an inlet pneumatic conduit 31 coupled to an associated source of pressurized shop air connected through a solenoid lift valve 32 to each of the air bags 26 and 27 via check valves 33 and 34 for simultaneously controlling inflation thereof to raise the lift assembly 25. Most of the pneumatic circuitry of FIG. 4 is preferably located in the left-hand housing 21 of FIG. 1, and is coupled to the right-hand air bag 27 via one or more extension conduits and associated quick couplers. The air bags 26 and 27 are also respectively coupled, at the outlets of the check valves 33 and 34, to solenoid exhaust valves 35 and 36 having exhaust ports for exhausting air to atmosphere to deflate the air bags 26 and 27 and lower the lift assembly 25. The solenoids of the valves 32, 35 and 36 are respectively controlled from the controller 30 via control lines 37, 38 and 39. The air bags 26 and 27 also respectively communicate with pressure transducers 40 and 41 via transducer conduits 42 and 43. The transducers 40 and 41 are preferably disposed in the control box 22 and are connected to the controller 30 for outputting electrical signals thereto corresponding to the pressure sensed in the air bags 26 and 27. The controller 30 may also be coupled to a suitable display device 44 and a data input device, such as a keyboard 47, for user interface with the control system.

It is a significant aspect of the invention that applicant has recognized that there exists a relationship between the pressure in the air bags 26 and 27 and the vehicle axle weight lifted thereby when the lift assembly 25 is in its raised position, lifting the vehicle tires 12 above the rollers 17. More specifically, it has been empirically determined that there is a linear relationship between the air bag pressure and the weight lifted thereby. It has also been empirically determined that different types of air bags, e.g., made by different manufacturers, have different linear relationships between pressure and weight, because of different types and stiffnesses of materials used, and the like. Referring to FIG. 6, there is illustrated a graph 45 depicting the linear relationship between pressure and weight for two different types of air bags, respectively designated A and B. It has been empirically determined that the slopes of the lines A and B remain substantially constant for each of a group of air bags, as long as they are of the same type, the line A having a slope of about 3.6 and the line B having a slope of about 4.4. The lines A and B do not extend to the Y-axis, since it was found that measurements taken at very low pressures and weights were unreliable. However, since the slopes of the lines A and B have been found to be substantially constant, they can be extrapolated to y-intercept points, yA and yB, respectively.

The general formula for a straight line is:

$$y = mx + b, \tag{1}$$

where m is the slope of the line, b is its y-intercept (the point at which it intersects the Y-axis), and x and y, respectively, represent the X and Y coordinates of a point on the line.

Applicant's recognition that there is a relationship between the pressure in an air bag and the weight lifted by it permits the air bags of the dynamometer 10 to be utilized in measuring vehicle axle weight. In general, such utilization would require a calibration procedure to establish the line defining the linear relationship. Thus, two points along the line would have to be determined. This would require the weighing of two separate vehicles, the axle weights of which preferably differ by at least 1,000 lbs., which can be a very burdensome procedure. However, applicant's discovery that the linear relationship has a constant slope for air bags of the same type permits the linear relationship to be defined with only a single point, such as the y-intercept. Thus, calibration can be effected with only a single vehicle weight, i.e., single-point calibration.

Referring to FIG. 7, there is shown a flow diagram 50 illustrating the procedure for calibrating the weighing system of the present invention. At 51, the lift assembly 25 is utilized to lift and, therefore, weigh a vehicle with a known axle weight. The air bag pressures, as sensed by the pressure transducers 40 and 41 when this known vehicle weight is lifted, are recorded at 52. Thus, on e point on the linear relationship line is now known. The routine then checks at 53 to determine which type of air bag is being utilized, A or B. Then, at 54, the system stores a calibration gain corresponding to the slope of the linear relationship for the selected type of air bag, A or B. With the slope and one point on the line now known, a second point, the y-intercept, can be calculated at 55, utilizing the formula (1) for a straight line. This calculated y-intercept is then stored at 56. The system is now calibrated.

Referring to FIG. 7, there is a flow diagram 60 illustrating the procedure for utilizing the weighing system of the present invention for obtaining the unknown weight of a vehicle under test. At 61, the air bag pressure is read when the lift assembly 25 is lifted to move the vehicle axle to the raised position. Then, at 62 the stored calibration slope for the particular type of air bag in use is read, and then the stored y-intercept value for the linear relationship is read at 63. Thus, utilizing the pressure (X coordinate value), the slope and the y-intercept, the Y coordinate value, which corresponds to the unknown weight lifted, is calculated at 64 utilizing the straight line formula (1). Thus the weight is equal to the measured air bag pressure multiplied by the slope of the linear relationship plus the y-intercept value.

By the use of the present invention, the dynamometer 10 can automatically measure and record the vehicle axle weight, the controller 30 then using the appropriate algorithm to calculate the friction losses in the dynamometer 10 in accordance with applicable regulations.

Preferably, the weighing system is menu-driven. When it is desired to utilize the dynamometer 10, an appropriate menu is called up on the display 44 for purposes of obtaining vehicle axle weight, and an appropriate menu selection may be selected by the user, utilizing the keyboard 47 (or a mouse). This may bring up additional menus guiding the user through the procedure for obtaining vehicle axle weight, which weight may then be displayed on the display 44.

While, for purposes of illustration, the dynamometer 10 has been illustrated as of the type with dual roller units 16, each of which is provided with an air bag-type lift unit, it will be appreciated that the principles of the present invention are applicable to other types of dynamometers utilizing fluid-actuated lift assemblies. Thus, for example, the dynamometer could have a single roller unit wide enough to accommodate both of the vehicle wheels, and could utilize a treadmill or treadmills instead of rollers.

From the foregoing, it can be seen that there has been provided an improved weighing system for a dynamometer which permits the pneumatic lift assembly for the dynamometer to be utilized in measuring vehicle axle weight and automatically calculating the friction losses therefrom.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A vehicle weighing system for a dynamic vehicle tester including a frictional drive assembly for engaging a pair of vehicle tires, and a fluid-actuated lift assembly coupled to a source of pressurized fluid and engageable with the vehicle for lifting the pair of vehicle tires and the associated portion of the vehicle to a raised position out of engagement with the drive assembly, the weighing system comprising:

a controller coupled to the drive assembly and to the lift assembly for controlling the operations thereof, and a pressure sensor connected to the controller and in fluid communication with the lift assembly for sensing the pressure in the lift assembly when in the raised position for generating a pressure signal, the controller including means operable under stored program control and responsive to the pressure signal for determining the weight of the vehicle portion lifted by the lift assembly.

2. The weighing system of claim 1, wherein said controller includes means for calibrating the means for determining weight.

3. The weighing system of claim 1, wherein the frictional drive assembly is a roller assembly.

4. The weighing system of claim 3, wherein the roller assembly includes two roller units for respectively engaging the vehicle tires of the pair.

5. The weighing system of claim 1, wherein said lift assembly is a pneumatically-actuated assembly.

6. The weighing system of claim 5, wherein the lift assembly includes an air bag.

7. The weighing system of claim 6, wherein the lift assembly includes two air bags with lift plates respectively connected thereto for respectively engaging the vehicle tires of the pair.

8. A vehicle weighing system for a dynamic vehicle tester including a frictional drive assembly for engaging a pair of vehicle tires, and a fluid-actuated lift assembly coupled to a source of pressurized fluid and engageable with the vehicle for lifting the pair of vehicle tires and the associated portion of the vehicle to a raised position out of engagement with the drive assembly, wherein there exists for the lift assembly a relationship between fluid pressure therein and vehicle weight lifted expressed as a function of a known constant parameter and a variable parameter, the weighing system comprising:

a controller coupled to the drive assembly and to the lift assembly for controlling the operations thereof, a pressure sensor connected to the controller and in fluid communication with the lift assembly for sensing the pressure in the lift assembly when in the raised position for generating a pressure signal, and a computer routine executed by the controller including:

(a) a first calibrating portion responsive to the pressure signal generated by lifting a known weight and to the known constant parameter for calculating the variable parameter; and (b) a weighing portion responsive to the pressure signal generated in lifting an unknown vehicle weight and to the known constant parameter and the calculated variable parameter for calculating the weight lifted.

9. The weighing system of claim 8, wherein the lift assembly includes an air bag.

10. The weighing system of claim 9, wherein the lift assembly includes two air bags with lift plates respectively connected thereto for respectively engaging the vehicle tires of the pair.

11. The weighing system of claim 9, wherein the constant parameter is associated with the type of air bag used.

12. The weighing system of claim 8, wherein the function is a straight line.

13. The weighing system of claim 12, wherein the constant parameter corresponds to the slope of the straight line.

14. The weighing system of claim 12, wherein the variable parameter corresponds to the y-intercept of the straight line.

15. A weight-measuring method utilizing a dynamic vehicle tester including a frictional drive assembly for engaging a pair of vehicle tires and a fluid-actuated lift assembly coupled to a source of pressurized fluid for lifting a portion of a vehicle from the frictional drive assembly, wherein there exists for the lift assembly a relationship between the fluid pressure therein and the weight lifted expressed as a function of a known constant parameter and a variable parameter, the method comprising:

lifting a known weight with the lift assembly and recording the known weight fluid pressure, utilizing the known weight and the known weight fluid pressure and the known constant parameter to calculate the variable parameter for calibrating the lift assembly, placing a vehicle on the tester with a pair of vehicle tires on the drive assembly, lifting an unknown vehicle weight by lifting the vehicle with the lift assembly and recording the unknown weight fluid pressure, and utilizing the unknown weight fluid pressure and the known constant parameter and the calculated variable parameter for calculating the unknown vehicle weight lifted.

16. The method of claim 15, wherein the lift assembly utilizes an air bag.

17. The method of claim 16, wherein the constant parameter is associated with the type of air bag used.

18. The method of claim 15, wherein the function is a straight line.

19. The method of claim 18, wherein the constant parameter corresponds to the slope of the straight line.

20. The method of claim 18, wherein the variable parameter corresponds to the y-intercept of the straight line.

\* \* \* \* \*

UNITED STATES PATENT AND TRADEMARK OFFICE
CERTIFICATE OF CORRECTION

PATENT NO. : 5,973,274

DATED : October 26, 1999

INVENTOR(S) :
Richard R. Zarchy

It is certified that error appears in the above-identified patent and that said Letters Patent is hereby corrected as shown below:

ON THE TITLE PAGE:

Item [56] Add the following patents to the list of references:

```
--- 3648791  3/72  Van Raden        4691792  9/87  Shintani
    3895681  7/75  Griffin et al.   4832141  5/89  Perini et al.
    4589507  5/86  Curran           4854407  8/89  Wagner
    4673048  6/87  Curran           5167289  12/92 Stevenson
    5182712  1/93  Kyrtsos et al.   5193063  3/93  Assh
    5592372  1/97  Artail et al.    5610372  3/97  Phillips et al.
```

Signed and Sealed this

Eleventh Day of July, 2000

Attest:

Attesting Officer

Q. TODD DICKINSON

Director of Patents and Trademarks